(No Model.)

W. J. WALDRON.
ANGLE COCK.

No. 566,636. Patented Aug. 25, 1896.

WITNESSES:
Edward Thorpe

INVENTOR
W. J. Waldron
BY
ATTORNEY.

UNITED STATES PATENT OFFICE.

WILLIAM J. WALDRON, OF FORT WORTH, TEXAS.

ANGLE-COCK.

SPECIFICATION forming part of Letters Patent No. 566,636, dated August 25, 1896.

Application filed February 3, 1896. Serial No. 577,897. (No model.)

*To all whom it may concern:*

Be it known that I, WILLIAM JOSEPH WALDRON, of Fort Worth, in the county of Tarrant and State of Texas, have invented a new and Improved Angle-Cock, of which the following is a full, clear, and exact description.

The invention relates to fluid-pressure brakes, and its object is to provide a new and improved angle-cock so constructed that the plug cannot be turned by an unauthorized person without the knowledge of the engineer in charge of the train.

A further object of the invention is to provide a locking device adapted for attachment to the bottom of any angle-cock or valve now in use.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both views.

Figure 1:
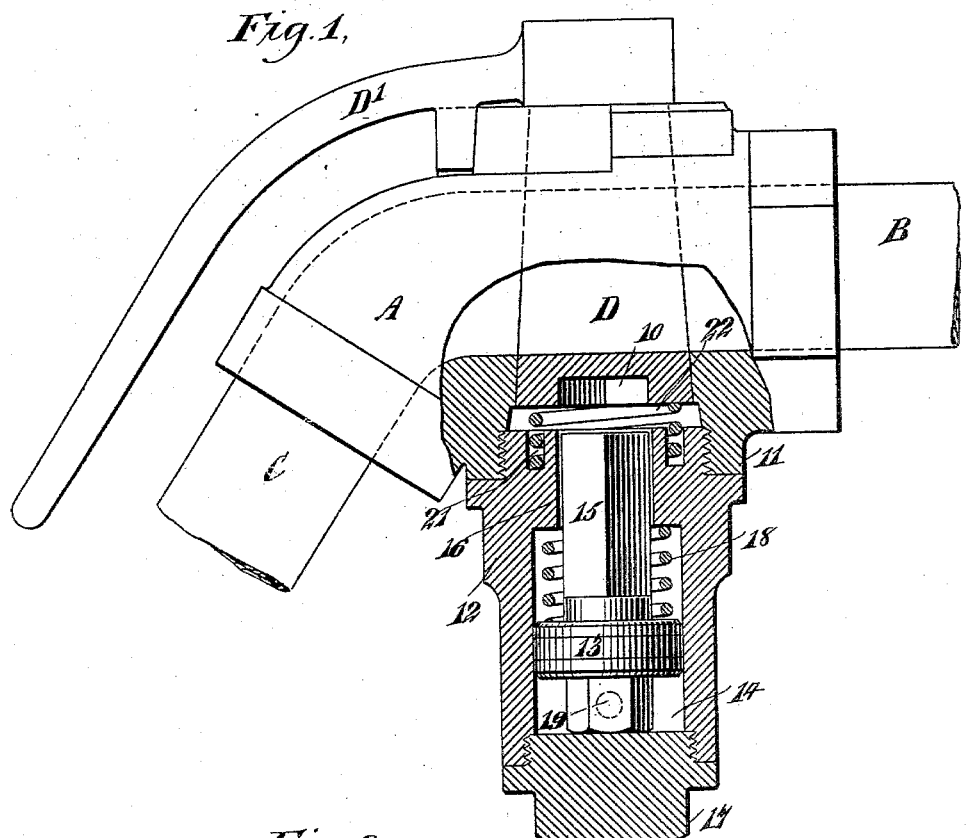
Figure 2:
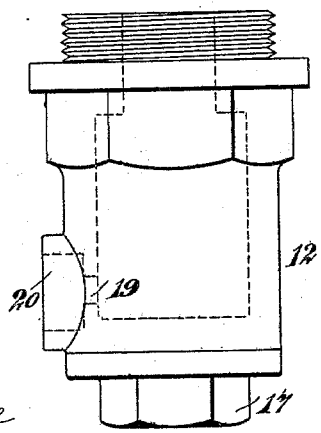

Figure 1 is a side elevation of the improvement with parts in section, and Fig. 2 is a side elevation of the locking-cylinder disconnected from the angle-cock.

The angle-cock is provided with the ordinary casing or body A, connected at one end with the train-pipe B and at its opposite end with a hose C, adapted to be coupled to the hose of an adjacent cock. In the aforesaid body A the usual valve or plug D is mounted to turn for establishing connection between the train-pipe and the hose or cutting off connection between the two, according to the open or closed position of the aforesaid plug D. The plug is provided at its lower or larger end with a polygonal recess 10, and at its upper or smaller end a handle D' is secured to the said plug to open and close the same. An annular flange 11 is produced in the casing around the lower end of the plug D, as shown in Fig. 1, and the lower portion of this flange is exteriorly threaded to receive the upper reduced and exteriorly-threaded portion of the locking-cylinder 12. A piston 13 is held to slide in the chamber 14 of the locking-cylinder, and the piston is provided with a rod 15, polygonal in cross-section, the upper end of which piston-rod is passed through a correspondingly-shaped guide-opening 16, made in the upper end of the locking-cylinder, and the lower end of this cylinder is preferably closed by a removable cap 17, screwed or otherwise secured in the aforesaid cylinder. A spring 18 is coiled around the piston-rod above the piston 13, having bearing at one end on the latter and on its opposite or upper end against the upper wall of the cylinder-chamber. The spring 18 normally acts to hold the piston in a lower position, or in such position that the upper end of its rod will be substantially flush with the upper edge of the cylinder, as shown in Fig. 1; but the piston-rod may be carried upward into the recess 10 in the bottom of the plug D of the valve whenever fluid under pressure is introduced into the said cylinder beneath the piston, and in order that the liquid may be so introduced into the cylinder an opening 19 is made in the side thereof near the bottom, as shown in both Figs. 1 and 2, and the said opening is usually enlarged at its outer end, and the enlarged portion surrounded by a collar 20, in order that a pipe leading from the source of fluid supply may be screwed in the aforesaid flange or collar. A recess 21 is made in the top of the locking-cylinder, the said recess being preferably annular, and it is carried around the guide-opening 16 in the cylinder, as shown in Fig. 1. One end of the spring 22 has a bearing against the bottom of the fluid-plug D, whereby the said plug is held firmly in its seat. The spring 22 is a coiled spring, and is of sufficient diameter to permit the upper end of the piston-rod to pass readily through it into the plug-recess 10. As long as fluid under pressure passes into the lower end of the cylinder the piston-rod will be held in the recess 10 of the plug, and therefore the position of the plug D cannot be changed, as the said fluid under pressure is under the control of the engineer in charge of the train, and the angle-cock cannot consequently be tampered with by unauthorized persons. As soon as the pressure in the bottom of the locking-cylinder is released the spring 18 acts to draw the piston-rod from the plug-recess 10, permitting the trainman to move the handle D' to close the plug D, if desired.

The coupling whereby the locking device may be controlled by the engineer is as follows: The reducing-valve for the air-whistle signal is coupled onto the return-pipe from the drum to the engineer's brake-valve, and then a cut-out and release-cock is coupled to the whistle-pipe, intended to charge the whistle-line or close the same, the whistle-line pipe being connected with the inlet-opening 19 in the bottom of the locking-cylinder. Under this arrangement no person can tamper with or turn off the air from any car or at the rear end of the tank of the engine without first having the release made by the engineer or the man in charge of the engine. It is evident that the attachment may be made to any angle-cock, and that by placing the locking-piston at the bottom instead of at the top of the angle-cock a more convenient disposition is made of the said locking device.

Having thus described my invention, I claim as new and desire to secure by Letters Patent—

1. A train-pipe angle-cock having a manually-operated plug provided with an aperture or recess, a locking device provided with a non-rotatable stem or rod adapted to enter the aperture or recess of the plug, and a connection for fluid-pressure, separate from the train-pipe, adapted to actuate said locking device and secure the plug in position without previous movement of the plug, substantially as described.

2. A train-pipe angle-cock having a manually-operated plug, a locking device provided with a cylinder attached to the bottom of the valve-casing, immediately below the plug, a tension device intervening the cylinder of the locking device and the plug, having bearing against both, the said cylinder being provided with a spring-controlled piston the rod of which is adapted to enter an opening in the plug, the cylinder being connected at a point below the piston with fluid-pressure under control of the engineer and independent of the train-pipe, as and for the purpose specified.

3. The combination, with an angle-cock comprising a body, a valve or plug mounted to turn therein, a handle connected with the said plug to turn the same, the plug being provided with an opening in its bottom, and a flange extending downward around the bottom portion of the plug, of a locking device comprising a cylinder secured in the flange portion of the casing and connected with fluid-pressure under control of the engineer, a piston located in the said cylinder above its connection with the fluid-pressure, a piston-rod polygonal in cross-section, attached to the piston and adapted to enter the opening in the plug, a spring normally holding the piston in lower position and the piston-rod within the cylinder, and a tension-spring seated in the upper end of the cylinder and having bearing against the bottom of the said plug, as and for the purpose specified.

WILLIAM J. WALDRON.

Witnesses:
J. W. COKER,
JAMES CHILDS.